United States Patent
Park et al.

(10) Patent No.: US 9,397,373 B2
(45) Date of Patent: Jul. 19, 2016

(54) LITHIUM ION SECONDARY BATTERY WITHOUT INTERNAL SHORT

(71) Applicant: LG Chem, Ltd., Seoul (KR)

(72) Inventors: Sung Joon Park, Daejeon (KR); Seung Don Choi, Daejeon (KR); Ho Jin Jeon, Daejeon (KR); Dae Sik Choi, Daejeon (KR); You Rim Yoon, Daejeon (KR); Chang Moon Jeong, Daejeon (KR); Jae Sik Yoon, Daejeon (KR); Yong Pal Park, Daejeon (KR)

(73) Assignee: LG Chem, Ltd. (KR)

( * ) Notice: Subject to any disclaimer, the term of this patent is extended or adjusted under 35 U.S.C. 154(b) by 152 days.

(21) Appl. No.: 14/148,948

(22) Filed: Jan. 7, 2014

(65) Prior Publication Data

US 2014/0127547 A1    May 8, 2014

Related U.S. Application Data

(63) Continuation of application No. PCT/KR2013/007637, filed on Aug. 26, 2013.

(30) Foreign Application Priority Data

Aug. 28, 2012 (KR) .......... 10-2012-0094363
Aug. 23, 2013 (KR) .......... 10-2013-0100181

(51) Int. Cl.
*H01M 10/42* (2006.01)
*H01M 2/16* (2006.01)
*H01M 4/62* (2006.01)
*H01M 10/0525* (2010.01)
*H01M 10/0567* (2010.01)
*H01M 4/36* (2006.01)

(52) U.S. Cl.
CPC ............ *H01M 10/4235* (2013.01); *H01M 2/16* (2013.01); *H01M 4/366* (2013.01); *H01M 4/62* (2013.01); *H01M 4/628* (2013.01); *H01M 10/0525* (2013.01); *H01M 10/0567* (2013.01); *Y02E 60/122* (2013.01); *Y02T 10/7011* (2013.01)

(58) Field of Classification Search
CPC ....................................... H01M 10/42
See application file for complete search history.

(56) References Cited

U.S. PATENT DOCUMENTS

| 6,245,458 | B1 | 6/2001 | Sotomura | |
|---|---|---|---|---|
| 6,730,440 | B1 * | 5/2004 | Bauer .................... | H01G 9/155 |
| | | | | 429/231.9 |
| 2002/0018940 | A1 * | 2/2002 | Nirasawa ............. | H01M 6/168 |
| | | | | 429/340 |
| 2003/0190530 | A1 | 10/2003 | Yang et al. | |
| 2004/0058232 | A1 * | 3/2004 | Kim ....................... | H01M 4/04 |
| | | | | 429/137 |
| 2005/0208385 | A1 | 9/2005 | Nirasawa | |
| 2009/0191465 | A1 | 7/2009 | Hwang | |
| 2010/0239915 | A1 | 9/2010 | Hochgatterer et al. | |
| 2011/0294019 | A1 * | 12/2011 | Amine et al. ................. | 429/338 |
| 2013/0260206 | A1 * | 10/2013 | Garsuch et al. .............. | 429/144 |

FOREIGN PATENT DOCUMENTS

| CN | 1322019 | A | 11/2001 |
|---|---|---|---|
| CN | 1322028 | A | 11/2001 |
| CN | 101796675 | A | 8/2010 |
| EP | 1143547 | A1 | 10/2001 |
| EP | 1148570 | A2 | 10/2001 |
| EP | 1150373 | A1 | 10/2001 |
| JP | H06-163049 | A | 6/1994 |
| JP | 2001-273927 | A | 10/2001 |
| JP | 2002-198053 | A | 7/2002 |
| JP | 2006-302756 | A | 11/2006 |
| JP | 2009-117081 | A | 5/2009 |
| JP | 2010-061932 | A | 3/2010 |
| KR | 20020020688 | A | 3/2002 |
| KR | 2010-0071778 | A | 6/2010 |

OTHER PUBLICATIONS

WO 2011007548 Derwent Abstract).*
Extended Search Report from European Application No. 13818180.5, dated Dec. 18, 2015.
International Search Report from PCT/KR2013/007637, dated Nov. 8, 2013.

* cited by examiner

*Primary Examiner* — Patrick Ryan
*Assistant Examiner* — Alex Usyatinsky
(74) *Attorney, Agent, or Firm* — Lerner, David, Littenberg, Krumholz & Mentlik, LLP

(57) ABSTRACT

A lithium ion secondary battery including a compound containing at least one thiol group (—SH) in a molecule in a unit cell of the battery is provided. By including the compound containing thiol group (—SH) having good reactivity with copper or copper ions, the formation of dendrite through the reduction of copper ions present in the inner portion of the battery or produced during operating the battery at the surface of an anode may be prevented. The internal short between two electrodes due to the dendrite may be also prevented.

2 Claims, No Drawings

LITHIUM ION SECONDARY BATTERY WITHOUT INTERNAL SHORT

CROSS-REFERENCE TO RELATED APPLICATIONS

This application is a continuation of International Application No. PCT/KR2013/007637, filed Aug. 26, 2013, which claims the benefit of Korean Patent Application Nos. 10-2012-94363 filed on Aug. 28, 2012 and 10-2013-0100181 filed on Aug. 23, 2013, in the Korean Intellectual Property Office, the disclosures of which are incorporated herein by references.

BACKGROUND OF THE INVENTION

1. Field of the Invention

The present invention relates to a lithium ion secondary battery confirming manufacturing quality and safety of the battery by restraining the internal short of the battery induced by the formation of dendrite within the battery.

2. Description of the Related Art

Generally, researches on development of a chargeable/dischargeable secondary battery in a high-tech field such as a digital camera, a cellular phone, a laptop computer, a hybrid vehicle, and the like are actively conducted different from a non chargeable primary battery.

The secondary battery includes a nickel-cadmium battery, a nickel-metal hydride battery, a nickel-hydrogen battery, a lithium secondary battery, and the like. Among the batteries, the lithium secondary battery has an operation voltage of 3.6 V or above, and is used as a power source of a portable electronic device or of a hybrid vehicle of a high power by connecting the batteries in series. The lithium secondary battery has the operation voltage higher by three times than the nickel-cadmium battery or the nickel-metal hydride battery, and has good energy density properties per unit weight. Thus, the lithium secondary battery is used at a fast-growing rate.

For maintaining the manufacturing quality of the lithium secondary battery and using the battery safely for a long time, the internal short of the battery induced by dendrite formed at the surface of an anode by the reduction of copper ion ($Cu^{2+}$) is necessary to be restrained. The copper ion is produced by the oxidation of copper foreign materials in the battery. In view of the manufacturing quality of a cell, defect ratios during manufacturing the cells may be increased by the dendrite generated from the reduction of metal ions during charging and discharging.

In addition, when the dendrite generated during the manufacturing makes an electric connection of a cathode and an anode due to external pressure or vibration, the safety and the stability of the cell during using may be deteriorated. During using the cell, the safety and the stability of the cell may be largely deteriorated due to the production of the dendrite by the reduction of additionally produced metal ions. Thus, the formation of the dendrite possibly making an electric connection between the cathode and the anode is necessary to be restrained in the lithium secondary battery.

SUMMARY OF THE INVENTION

According to an aspect of the present invention, the formation of dendrite due to the reduction of copper and the internal short of the battery generated due to the dendrite may be remarkably restrained by (i) effectively capping copper ions present in the battery or produced during the operation of the battery, or (ii) providing a material having good reactivity with the copper ions.

According to an aspect of the present invention, a lithium ion secondary battery restraining the internal short of the battery and having improved manufacturing quality of a cell may be provided by including a material having good reactivity with copper ions in a unit cell.

An aspect of the present invention provides a lithium ion secondary battery comprising a compound containing at least one thiol group (—SH) in a molecule in a unit cell of a battery.

In an embodiment, the compound containing at least one thiol group (—SH) may be comprised in at least one element constituting the battery, for example, at least one element selected from the group consisting of an electrode, a separator, and an electrolyte.

The electrode may comprise the compound containing at least one thiol group (—SH) as a constituent component in the electrode material, or as a coating component of the electrode.

In addition, the electrolyte may comprise a lithium salt, an electrolyte solvent, and the compound containing at least one thiol group (—SH). Further, the content of the compound containing at least one thiol group (—SH) may be about 0.01 to 10 parts by weight based on 100 parts by weight of a total amount of the electrolyte.

The separator may comprise the compound containing at least one thiol group (—SH) as a constituent component of the separator, or as a coating component of the separator.

According to the present invention, the formation of dendrite and the generation of internal short of the battery due to the dendrite may be prevented, and the safety of the battery may be confirmed by using a compound containing a thiol group, having good reactivity with copper ions in a unit cell, in which a battery reaction occurs.

DETAILED DESCRIPTION OF THE PREFERRED EMBODIMENT

Exemplary embodiments of the present invention will now be described in detail. However, the present invention is not limited or restricted to the following exemplary embodiments.

A lithium ion secondary battery may comprise various metal components as foreign materials such as a copper component and an alloy component including copper. Copper foreign materials may be oxidized to a copper ion ($Cu^{2+}$) during operation of the battery, or the produced copper ion may be reduced to be precipitated as a copper component on the surface of an anode.

Since copper (Cu) does not produce an oxide which may passivate itself, dendritic growth, which may induce regrowth may be generated. The thus precipitated needle-shape copper on the surface of the anode may penetrate into a separator and make an electric connection between a cathode and an anode. In this case, an internal short may be generated, and the safety of the battery may be deteriorated. At the same time, the manufacturing quality of a cell may be decreased and defect ratio may be increased.

According to an embodiment of the present invention, a material having high reactivity with copper or copper ions is provided in a unit cell of a lithium ion secondary battery to basically prevent the generation of the internal short of the battery due to the formation of dendrite.

A compound provided in the lithium ion secondary battery, preferably, in the unit cell, may comprise at least one thiol group (—SH) in a molecule.

The compound containing thiol group (—SH) in the molecule has a high selectivity to the copper ions present in the battery or generated during operating the battery. The compound containing thiol group (—SH) is present as an original state under normal conditions and has no influence on the operation of the battery. When the copper or the copper ions are present, the compound containing thiol group (—SH) makes a spontaneous reaction with or captures the copper or the copper ions before being reduced on the surface of the anode.

The compound containing thiol group (—SH) in a molecule may be at least one aliphatic thiol selected from the group consisting of methanethiol and ethanethiol; at least one aromatic thiol selected from the group consisting of thiophenol, 4-fluorothiophenol, 2-chlorothiophenol, 4-t-butyl thiophenol, and 4-t-butyl-1,2-benzenethiol; 2-(butylamino) ethanethiol; 3-(methylthio)propylamine; and [2-(diisopropylamino) ethyl]- (2-mercaptoethyl) sulfide. The compound containing thiol group (—SH) may comprise a single material or a mixture of two or more thereof.

The amount of the compound including at least one thiol group (—SH) in a molecule may be controlled by considering the kinds of the elements constituting the lithium secondary battery, for example, an electrode active material, an electrode, a separator, an electrolyte, a batter case, and/or an empty space in the battery, etc. However, the amount of the compound including at least one thiol group (—SH) is not specifically limited to a certain range.

The compound containing thiol group (—SH) may be applied in the unit cell of the battery regardless of the use, the position, etc. For example, the compound containing thiol group (—SH) may be used as a constituent component of the lithium ion battery, for example, an electrode active material, an electrode, a separator, an electrolyte, a batter case, and/or an empty space in the battery, etc., or as a coating component thereof.

A lithium ion secondary battery comprising the compound containing thiol group (—SH) in a unit cell of the battery may include five example embodiments mainly. However, the present invention is not limited thereto.

Electrode Comprising Compound Containing at Least One Thiol Group in Molecule

1) In the first embodiment of the lithium ion secondary battery comprising the compound containing thiol group (—SH), the compound is used as a constituent component of an electrode, and more particularly, as a coating component of an electrode active material.

A method of preparing the electrode active material coated with the compound containing thiol group (—SH) is not specifically limited. In a preferred embodiment, the method may include (a) preparing a coating solution comprising a compound containing thiol group (—SH) by dispersing the compound containing thiol group (—SH) in a binder solution or a solvent, (b) adding electrode active material particles into the coating solution prepared in step (a) and stirring, and (c) heat treating the coated electrode active material prepared in step (b).

As a cathode active material capable of being coated with the compound containing thiol group (—SH) in a molecule, cathode active materials commonly used in a cathode of a common lithium ion secondary battery may be used. Non-limiting examples of the cathode active material include a lithium transition metal composite oxide such as $LiM_xO_y$ (M=Co, Ni, Mn, or $Co_aNi_bMn_c$) (for example, a lithium manganese composite oxide such as $LiMn_2O_4$, a lithium nickel oxide such as $LiNiO_2$, a lithium cobalt oxide such as $LiCoO_2$, a compound obtained by substituting a portion of manganese, nickel, or cobalt of the oxide with other transition metal, or vanadium oxide containing lithium), or a chalcogen compound (for example, manganese dioxide, titanium disulfide, or molybdenum disulfide). Preferably, $LiCoO_2$, $LiNiO_2$, $LiMnO_2$, $LiMn_2O_4$, Li $(Ni_aCo_bMn_c)$ $O_2$ (0<a<1, 0<b<1, 0<c<1, and a+b+c=1), $LiNi_{1-y}Co_yO_2$, $LiCo_{1-y}Mn_yO_2$, $LiNi_{1-y}Mn_yO_2$ (wherein, 0≤Y1), Li $(Ni_aCo_bMn_c)$ $O_4$ (0<a<2, 0<b<2, 0<c<2, and a+b+c=2), $LiMn_{2-z}Ni_zO_4$, $LiMn_{2-z}Co_zO_4$ (wherein, 0<Z<2), $LiCoPO_4$, $LiFePO_4$, or a mixture thereof may be used.

As an anode active material capable of being coated with the compound containing thiol group (—SH) in a molecule, anode active materials commonly used in an anode of a common lithium ion secondary battery may be used. Non-limiting examples of the anode active material include a lithium metal, or a lithium alloy, a lithium absorbing material such as carbon, petroleum coke, activated carbon, graphite, a silicon-based material, a tin-based material, or a carbon-based material, and an active material used in an anode. Non-limiting examples of a cathode current collector include aluminum, nickel, and a foil manufactured by combining thereof, and non-limiting examples of an anode current collector include copper, gold, nickel, a copper alloy, and a foil manufactured by combining thereof.

A general coating process commonly used in this art may be used for a coating process. For example, a solvent evaporation method, a coprecipitation method, a precipitation method, a sol-gel method, a filtering after absorbing method, a sputtering method, and a chemical vapor deposition (CVD) method may be illustrated.

2) In the second embodiment of the lithium ion secondary battery comprising the compound containing thiol group (—SH), the compound is used as a constituent component of an electrode unit, and more particularly, as one component of an electrode, and/or 3) as a coating component of a pre-manufactured electrode according to the third embodiment.

A method of preparing the electrode comprising the compound containing thiol group (—SH) as a constituent component is not specifically limited. In a preferred embodiment, the method may include (a) preparing an electrode slurry by mixing the compound containing thiol group (—SH) with an electrode material, for example, an electrode active material, a conductive material, a binder, etc. as occasion demands, and coating the electrode slurry on a current collector or on the surface of pre-manufactured electrode, and (b) drying the electrode.

Hereinafter, a method of dispersing the compound containing thiol group (—SH) in an electrode will be described in detail referring to an embodiment.

First, i) a binder solution is prepared by adding a binder (for example, polyvinylidene fluoride (PVDF)) into a solvent or a dispersing solvent (for example, N-methyl pyrrolidone (NMP)).

Common solvents used in this art may be used as the solvent or the dispersing solvent used for the preparation of the binder solution. Non-limiting examples thereof include an organic solvent such as N-methylpyrrolidone, acetone, dimethylacetamide, dimethylformaldehyde, and the like, an inorganic solvent such as water, and a mixture thereof. The amount of the solvent may be determined by considering the coated thickness of the electrode slurry and production yield, and may be sufficient only if the active material, the conductive material, the electrode binder and the adhesive additive may be dissolved and dispersed. After coating the electrode slurry on a current collector, the solvent may be removed by drying.

ii) The electrode active material and the compound containing thiol group (—SH) are added into the thus obtained binder solution, and mixed for completely dispersion. Then the thus obtained dispersion was coated on the current collector and dried to manufacture an electrode.

As described above, the electrode active material, and the conductive material are added into the binder solution comprising the compound containing thiol group (—SH) and stirred using a mixer to prepare an electrode slurry. The drying process of the electrode may be conducted by a common method known in the art and may include a hot air drying process.

The binder may include a common binder and may include PVDF, styrene butadiene rubber (SBR), Teflon, and a mixture thereof, without limitation.

The conductive material may include any material that may improve conductivity, and non-limiting examples of the conductive material include acetylene black, and graphite.

A method of manufacturing an electrode by using the compound containing thiol group (—SH) as a coating component of an electrode may comprise a commonly known method in this art. For example, a dispersion including a compound containing thiol group (—SH) may be prepared by dispersing the compound containing thiol group (—SH) in a binder solution or a solvent, and the dispersion may be coated on the surface of a pre-manufactured electrode and dried.

The amount of the compound containing at least one thiol group (—SH) in a molecule may be 0.01 to 10 parts by weight based on 100 parts by weight of an electrode material, however, the amount of the compound is not limited thereto.

A coating layer of the compound containing at least one thiol group (—SH) may be formed on the partial surface or on the entire surface of the electrode according to the above-described two embodiments. The electrode comprising the coating layer of the compound containing thiol group (—SH) may selectively capture copper ions or may react with the copper ions prior to the reduction of the copper ions on the surface of the anode. Thus, the formation of copper dendrite due to the reduction at the surface of the anode may be prevented.

Electrolyte Comprising Compound Containing at Least One Thiol Group in Molecule

4) In the fourth embodiment of the lithium ion secondary battery comprising the compound containing thiol group (—SH), the compound containing thiol group (—SH) is added into a common electrolyte for a battery.

The electrolyte for battery comprising the compound containing thiol group (—SH) may comprise commonly known electrolyte components in this art such as a lithium salt and a non-aqueous organic solvent.

The lithium salt may include a material easily dissolved in the non-aqueous organic solvent, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborane, lithium lower aliphatic carbonate, lithium 4-phenyl borate, imide, and the like.

Non-limiting examples of the non-aqueous organic solvent include aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxyethane, tetrahydroxy franc, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, and the like.

Into the non-aqueous electrolyte, pyridine, triethyl phosphite, triethanolamine, cyclic ether, ethylenediamine, n-glyme, hexaphosphate triamide, nitrobenzene derivatives, sulfur, quinone imine dyes, N-substituted oxazolidinone, N,N-substituted imidazolidine, ethylene glycol dialkylether, ammonium salt, pyrrole, 2-methoxyethanol, trichloroaluminum, and the like may be added to improve the charge/discharge properties and the flame retardancy of the battery. In some cases, a halogen-containing solvent such as carbon tetrachloride, trifluoroethylene, etc. may be further included to impart incombustibility, and a carbon dioxide gas may be further included to improve preserving properties at a high temperature in the electrolyte.

In this case, the amount of the compound containing at least one thiol in a molecule may be appropriately controlled by considering the safety and the manufacturing quality of a cell of a battery. For example, the amount of the compound may be 0.01 to 10 parts by weight based on 100 parts by weight of the electrolyte.

Separator Comprising Compound Containing at Least One Thiol Group in Molecule

5) In the fifth embodiment of the lithium ion secondary battery comprising the compound containing thiol group (—SH), the compound containing thiol group (—SH) is used as a constituent component of a separator for a battery, or as a coating component of a separator for a common battery.

For example, a polyolefin-based separator substrate may be impregnated with a coating solution comprising the compound containing thiol group (—SH), or the coating solution may be coated on the separator substrate and dried to obtain a separator including the compound as known in this art.

The separator for receiving the compound containing thiol group (—SH) may be any porous material blocking the internal short of both electrodes and being impregnated with the electrolyte, without limitation. The pore diameter of the separator may be generally in a range from 0.01 to 10 μm, and the thickness may be in a range from 5 to 300 μm. As the separator, for example, an olefin-based polymer such as chemical-resistant and hydrophobic polypropylene, etc.; a composite porous separator obtained by adding an inorganic material into a porous separator substrate; a sheet or a non-woven fabric formed by using glass fiber, polyethylene, etc. maybe used. When a solid electrolyte such as a polymer is used as the electrolyte, the solid electrolyte may additionally perform the function of the separator.

In addition, the same effect may be obtained when introducing the compound containing thiol group (—SH) in an inner empty space of the lithium ion secondary battery such as mandrel, center pin, PTC, etc.

Even though the compounds containing thiol are illustrated particularly in the present invention, other materials having high reactivity with copper ions may be used regardless of components, amounts, shapes thereof, and may be included in the present invention.

The lithium ion secondary battery according to the present invention may be manufactured by a common method known in this art. For example, a cathode and an anode are assembled with a separator interposed therebetween, and an electrolyte is injected to obtain the lithium ion secondary battery. In this case, the compound containing thiol group (—SH) may be introduced in at least one portion among an electrode, an electrolyte, a separator, and a case. In this case, the compound containing thiol group (—SH) maybe introduced at least one inner space of an electrode active material, an electrode, an electrolyte, a separator, mandrel, center pin, a device case.

As described above, preferred embodiments have been explained in detailed description section of the present application. However, various modifications without deviated from the scope of the present invention may be made. It will be apparent to those skilled in the art that modifications and variations can be made without departing from the spirit and scope of the invention as defined by the appended claims.

EXAMPLES

Example 1

A slurry was prepared by adding 90 wt % of $LiCoO_6$ as a cathode active material, 6 wt % of denka black as a conductive material, and 4 wt % of PVDF as a binder into NMP and mixing. The slurry was coated on an aluminum (Al) foil, which was a cathode current collector, pressurized and dried to manufacture a cathode.

An another slurry was prepared by adding 90 wt % of graphite as an anode active material, 6 wt % of denka black as a conductive material, and 4 wt % of PVDF as a binder into NMP and mixing. The slurry was coated on a copper (Cu) foil, which was an anode current collector, pressurized and dried to manufacture an anode.

A porous polyethylene separator was interposed between the thus manufactured cathode and anode and assembled to fabricate an electrode assembly. The electrode assembly was inserted into a case, and an electrode lead was connected to the electrode assembly. Then, an electrolyte prepared by adding 1% of methanethiol into a solution including ethylene carbonate (EC) and dimethyl carbonate (DMC) by the volume ratio of 1:1 and including 1 M of $LiPF_6$, was injected into the electrode assembly and sealed to manufacture a lithium ion secondary battery.

Example 2

A slurry was prepared by adding 90 wt % of $LiCoO_2$ as a cathode active material, 6 wt % of denka black as a conductive material, and 4 wt % of PVDF as a binder into NMP. The slurry was coated on an aluminum (Al) foil, which was a cathode current collector, pressurized and dried to manufacture a cathode.

An another slurry was prepared by adding 90 wt % of graphite as an anode active material, 6 wt % of denka black as a conductive material, and 4 wt % of PVDF as a binder into NMP. The slurry was coated on a copper (Cu) foil, which was an anode current collector, pressurized and dried to manufacture an anode.

On the surface of a porous polyethylene separator coated with an inorganic material, 99 wt % of $Al_2O_3$ and 1 wt % of methanethiol were dispersed and coated to manufacture a separator.

The coated separator was interposed between the thus manufactured cathode and anode and assembled to fabricate an electrode assembly. The electrode assembly was inserted into a case, and an electrode lead was connected to the electrode assembly. Then, an electrolyte including ethylene carbonate (EC) and dimethyl carbonate (DMC) by the volume ratio of 1:1 and including 1 M of $LiPF_6$, was injected into the electrode assembly and sealed to manufacture a lithium ion secondary battery.

Comparative Example 1

A lithium ion secondary battery was manufactured by conducting the same procedure described in Example 1 except for excluding methanethiol from the electrolyte.

Comparative Example 2

A lithium ion secondary battery was manufactured by conducting the same procedure described in Example 2 except for excluding methanethiol from the coated separator.

Experiment 1

For 10,000 cells of the lithium ion secondary battery respectively manufactured by Example 1 and Comparative Example 1, voltage drop was measured for two weeks. The results are illustrated in the following Table 1.

TABLE 1

| Division | Example 1 | Comparative Example 1 |
|---|---|---|
| Number of cells generating voltage drop above 20 mV | 9 | 34 |

Experiment 2

For 1,000 cells of the lithium ion secondary battery respectively manufactured by Example 2 and Comparative Example 2, voltage drop was measured for two weeks. The results are illustrated in the following Table 2.

TABLE 2

| Division | Example 2 | Comparative Example 2 |
|---|---|---|
| Number of cells generating voltage drop above 20 mV | 1 | 3 |

What is claimed is:

1. A lithium ion secondary battery comprising a compound containing at least one thiol group (—SH) in a molecule in an electrode of a battery, wherein the electrode includes the compound containing at least one thiol group (—SH) in a molecule as a constituent component in the electrode, or as a coating component of the electrode, the compound containing at least one thiol group (—SH) in a molecule is an aliphatic thiol selected from the group consisting of methanethiol, ethanethiol, and a mixture thereof, the compound containing at least one thiol group (—SH) in a molecule reacts with copper ions being oxidized from copper foreign materials and being generated during operation of the battery to prevent forming dendrite due to reduction of the copper ions at a surface of an anode, the copper foreign materials comprise a copper component or an alloy component including copper, and an amount of the compound containing at least one thiol group (—SH) in a molecule may be 0.01 to 10 parts by weight based on 100 parts by weight of the electrode material.

2. A battery module comprising the lithium ion secondary battery according to claim 1 as a unit battery.

* * * * *